United States Patent [19]

Dome

[11] 3,751,590

[45] Aug. 7, 1973

[54] SINGLE SECOND DETECTOR SYSTEM FOR A COLOR TELEVISION RECEIVER

[75] Inventor: Robert B. Dome, Syracuse, N.Y.

[73] Assignee: General Electric Company, Portsmouth, Va.

[22] Filed: Feb. 3, 1971

[21] Appl. No.: 112,136

[52] U.S. Cl. .......... 178/5.4 R
[51] Int. Cl. .......... H04n 9/12
[58] Field of Search .......... 178/5.4 R, 5.8 A

[56] References Cited

UNITED STATES PATENTS 2,989,581 6/1961 Keizer et al. .......... 178/5.4 R

*Primary Examiner*—Richard Murray
*Attorney*—Harry C. Burgess, W. J. Shanley, Frank L. Neuhauser, Stanley C. Corwin, Oscar B. Waddell, F. W. Powers and Joseph B. Forman

[57] ABSTRACT

A color television receiver circuit which by unique proportioning of the transfer characteristics before and after a single second detector it is possible to render tish and 920 KC picture disturbances invisible without resorting to prior techniques for exalting the carrier.

4 Claims, 7 Drawing Figures

INVENTOR.
ROBERT B. DOME
BY James E. Espe
ATTORNEYS

INVENTOR.
ROBERT B. DOME

BY James E. Espe

ATTORNEYS

SINGLE SECOND DETECTOR SYSTEM FOR A COLOR TELEVISION RECEIVER

BACKGROUND OF THE INVENTION

In conventional receivers, as they are now designed and manufactured, two second detectors are employed. One detector detects the luminance and chrominance information; the other detector detects the 4.5 MHz wave which is FM modulated by the sound of the program being transmitted.

Separate detectors are required in order to avoid the generation of a spurious signal in the video frequencies to be applied to the picture reproducing device. The spurious signal occurs at 920 KHz and is the result of the heterodyne between the single sideband representing the color information lying 3.58 MHz from the picture carrier frequency and the single sideband representing the sound information lying 4.50 MHz from the picture carrier frequency.

In conventional receivers a circuit ahead of the luminance/chrominance detector provides a very high degree of attenuation to the sound sideband lying 4.50 MHz from the picture carrier frequency so that the detector does not have to contend with the sound sideband. The result is that the 920 KHz beat is negligibly small in amplitude at the luminance/chrominance detector output.

Since the sound sideband has been essentially excluded at the luminance/chrominance detector, there will be little or no 4.5 MHz sound signal available at that detector for use in developing the sound portion of the program. It has therefore been found to be necessary to provide a separate second detector to obtain the 4.5 MHz sound signal.

The disadvantages of the conventional receiver arrangement are: (1) Two detectors are required, and (2) The sound I.F. trap at 41.25 MHz (if the picture I.F. carrier is 45.75 MHz), which has to provide very high attenuation at a frequency very close to the I.F. chroma subcarrier at 42.17 MHz, becomes relatively costly and requires very accurate tuning.

One previously suggested arrangement which results in being able to use a single second detector for luminance, chrominance, and 4.5 MHz sound is that in which an unmodulated picture carrier wave of considerable magnitude (with respect to the amplitude of the sideband signals) is injected into the second detector input along with the picture I.F. signal.

The disadvantages of injected high amplitude synchronous detector systems are that (1) balanced detectors are required in order to cancel out the d.c. component arising from the high amplitude injected wave, (2) tweets, i.e., harmonics of the carrier I.F. will now be relatively strong and may get into the tuner input circuit and cause typical herring-bone spurious picture patterns, (3) if a synchronized oscillator is used, loss of synchronism could cause the picture to be ruined by very strong low frequency video signals, and (4) a very close phase lock is required in order to avoid bothersome quadrature distortion.

An arrangement has been suggested in "Principles of Color Television," McIlwain and Dean, pp. 352–354 (John Wiley & Sons, Inc., 1956). In this arrangement, the IF passband is shaped to increase the picture carrier amplitude relative to the other frequencies in the passband. However the thoughts expressed here lead to impractical color television receivers not suited to mass production, and in fact to receivers which still require a sound trap.

In a color television receiver for use with the NTSC system of signal transmission, the presence of appreciable 41.25 MHz sound I.F. at the second detector can cause two kinds of distortion in the reproduced picture. The first is a luminance distortion caused by the 920 KHz beat between the sound at 41.25 MHz and the chrominance at 42.17 MHz. The second is a chrominance distortion commonly called "tish" caused by a spurious 3.58 MHz color signal generated as the result of 41.25 MHz sound I.F. beating with picture modulation corresponding to 920 KHz, or at 44.83 MHz at I.F.

SUMMARY OF THE INVENTION

Consequently, it is an object of the present invention to provide a color television receiver, immune to the above distortions, with a single second detector system, without increasing the carrier and without the use of carrier injection, and without the use of any sound trap — or at least without more than minimal inexpensive sound trapping.

In achieving this object, the detector system comprises an input I.F. bandpass network with a bandpass transfer characteristic having attenuation, relative to and away from the picture carrier, sufficient to make negligible the visibility of the above distortions in the image produced. The output of the I.F. bandpass network is coupled to a single second detector which in turn is coupled to another bandpass circuit network wherein proper relative amplitudes of the detected signals are restored. The output of the latter bandpass network is then coupled to circuit means for supplying the detected luminance, chrominance subcarrier sidebands, and synchronizing signals, and sound intercarrier signals directly to subsequent utilization circuits.

DESCRIPTION OF PREFERRED EMBODIMENT OF INVENTION

Figures 1, 2, 3, 4:
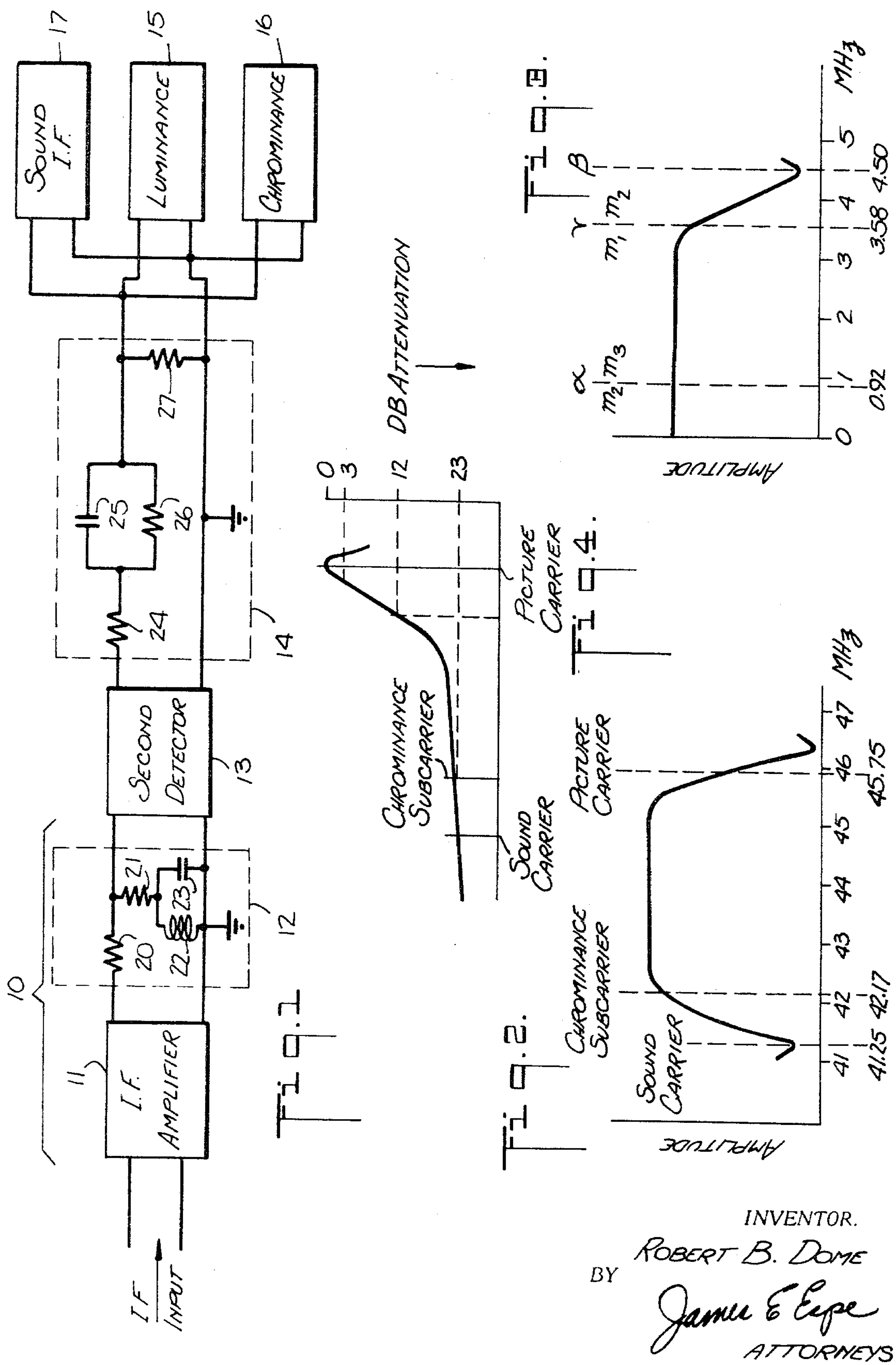
FIG. 1 is a simplified schematic representation of a single detector system useful in explaining the principles of this invention.
FIGS. 2–4 are frequency response curves for the system of FIG. 1.

The single second detector system of the invention, shown in FIG. 1 in simplified schematic form, comprises an input intermediate frequency bandpass network 10 having a conventional intermediate frequency amplifier 11 and a bandpass shaping network 12. The transfer characteristic of network 12 is proportioned in the manner described later to provide attenuation, relative to and away from the picture carrier, sufficient to make negligible the visibility of the above "920 KC" and "tish" distortions in the image produced.

The system of the invention further includes the second detector 13 in which the composite video signal is detected with the components thereof being at improper relative amplitudes due to the shaped transfer characteristic of network 12.

Another bandpass network 14, having a transfer characteristic such that the proper relative amplitudes are restored to the composite video signal is coupled to the output of detector 13. The signal at the output terminals of amplitude restoring bandpass network 14 is then supplied directly to luminance channel 15, chrominance channel 16, and sound intermediate frequency channel 17 for utilization. Channels 15, 16 and 17 are of conventional construction.

A more detailed analysis of the above distortions produced in a color television receiver and the manner in which the transfer characteristic of network 12, i.e., relative attenuations, can be determined so that these distortions are minimized in a single second detector system in accordance with this invention will now be considered.

In a conventional color television receiver adapted for reception of a vestigial sideband color television signal transmitted in accordance with "NTSC" U.S. transmission standards, the nominal intermediate frequency passband is as shown in FIG. 2. After detection in the second detector, the video frequency passband of FIG. 3 results. It is a known fact that the presence of appreciable sound carrier at the input of the second detector can cause two kinds of distortion in the reproduced picture. The first is a brightness or luminance distortion at a frequency of 920 KHz resulting from the beat between the sound carrier (41.25 MHz) and the chrominance subcarrier (42.17 MHz). The second is a color or chrominance distortion, commonly known as "tish," caused by a spurious 3.58 MHz color signal resulting from the beat between the sound carrier and video modulation occurring as I.F. in the region of 44.83 MHz or 920 KHz away from the picture carrier. Since this spurious beat signal is at 3.58 MHz, it passes into the chrominance circuits to be demodulated as a color signal thus producing the chrominance distortion in the picture.

In accordance with an analysis of the vestigial sideband set up of the NTSC system (see, for example, Analysis Of The Vestigial Sideband NTSC System below), these two distortion components (plus a third which may be ignored) may be treated in terms of coefficients $m_1$, $m_2$, and $m_3$ of sine cosine distortion signals as follows:

Chrominance distortion coefficient ("tish") $= m_1 m_2$ (1)

luminance distortion coefficient (920KHz) $= m_2 m_3$ (2)

ignored distortion $= m_1\ m_3$ in which $$m_1 = E_1/E_p \quad (3)$$

$$m_2 = E_2/E_p \quad (4)$$

$$m_3 = E_3/E_p \quad (5)$$

where:

$E_p$ = carrier amplitude $E_1$ = amplitude of a single sideband approximately 1 MHz from the carrier $E_2$ = amplitude of a single sideband 4.5 MHz from the carrier $E_3$ = amplitude of a single sideband 3.58 MHz from the carrier The $m_1 m_2$ distortion signal may be seen in monochrome receivers when they are improperly tuned "into sound" and appear as racy streaks in the picture and as sparkling edges to lettering in the picture. When the receiver is properly tuned, the sound sideband amplitude is so attenuated that $m_2$ is very low, i.e., some 26 db or 5 percent as compared to the brightness video $m_1$, so that this spurious signal, while always present, is not sufficiently strong to be disturbing. $m_1$ is also usually quite low for any single video frequency.

In a color receiver the $m_1 m_2$ distortion signal can cause a disturbance in the chroma chain. For example, the sound carrier may beat with a video frequency in the 1 MHz region to cause an undesired frequency to be present in the 3.6 MHz region of the chroma channel. This is much more serious than sound beating with picture in monochrome because the beat note in color can represent a very low frequency when measured from the 3.58 MHz subcarrier frequency. It is therefore important to arrange the design of the receiver to minimize this type of interference sometimes referred to as "tish." If the tish signal, represented by $m_1 m_2$ is to be no more than a fraction X of the chroma signal $m_3$ then obviously, $X = m_1 m_2/m_3$. But since $m_1 = m_3$ approximately at each of their maximum values, then $X = m_2$, or if it is desired to make tish 1 percent, $X = 0.01$ and $m_2 = 0.01$, or the sound must be attenuated 40 db with respect to the picture carrier. Such an attenuation will cause trouble in sound recovery because spurious signals, particularly harmonics of the video, can occur at or close to 4.5 MHz which may be strong enough to exceed the sound I.F. signal and cause the sound FM detector to lose capture and cause unwanted interruptions in the sound reproduced.

The $m_1 m_3$ distortion signal is unique to color television. Fortunately it is a low visibility signal because the beat frequencies are located principally at odd multiples of half the horizontal scanning frequency and as such have an observed attenuation, insofar as the eye is concerned, of approximately 17 db. Alignment procedure calls for $m_2$ to be 0.6 $m_1$ maximum, so another 4.5 db may be added to the 17 db to yield 21.5 db, which begins to approach the levels corresponding to monochrome sound disturbance, and so may be regarded as still being present but tolerable.

The $m_2 m_3$ distortion signal is also unique to color. While the standards have been set up so that the unmodulated sound carrier beats with the chroma subcarrier to give a low visibility video frequency unfortunately the sound carrier is frequency modulated with sound so that when modulation is present the beat frequency may be at a harmonic of the line frequency and will have maximum visibility.

$m_2$ may have a very high amplitude in contrast to $m_1$, and may be present in a steady state for long periods of time over a considerable portion of the picture area. As a result of this, the so-called "920 KHz" beat signal can be very annoying and can seriously degrade the picture quality.

It is therefore important to avoid contaminating the brightness signal with the 920 KHz beat signal in a production receiver.

In a conventional color receiver in which the received signal is passed through a vestigial sideband filter with the picture carrier at the 6 db point on the slope of the passband (such as is shown in FIG. 2), the amplitudes of components $E_1$, $E_2$, $E_3$ and $E_p$ may be shown to be as follows for a received signal having a maximum amplitude chrominance subcarrier (corresponding to a reddish flat field), this being the "worst"

condition under which a color receiver must operate insofar as the above distortions are concerned:

$$E_1 = 0.14 \text{ (1 MHz)} \quad (6)$$

$$E_2 = 0.447 \text{ (4.5 MHz)} \quad (7)$$

$$E_3 = 0.176 \text{ (3.58 MHz)} \quad (8)$$

$$E_p = 0.258 \text{ (picture Carrier)} \quad (9)$$

In the foregoing expressions (6), (7), (8) and (9), the numerical values are the peak amplitudes of the modulation components at the respective indicated frequencies at and away from the picture carrier relative to the peak amplitude of the picture carrier as transmitted, i.e., prior to passage through the conventional IF passband network of a receiver.

Now in the circuit arrangement of the invention, there will be attenuations $\alpha$, $\beta$ and $\gamma$ for $E_1$, $E_2$, and $E_3$ respectively with respect to $E_p$ so that the values given above become:

$$E_1 = 0.14\ \alpha \quad (10)$$

$$E_2 = 0.447\ \beta \quad (11)$$

$$E_3 = 0.176\ \gamma \quad (12)$$

$$E_p = 0.258 \quad (13)$$

Substituting equations (10) to (13) into equations (3), (4) and (5), $$m_1 = 0.14\alpha/0.258 = 0.541\alpha \quad (14)$$

$$m_2 = 0.447\beta/0.258 = 1.73\beta \quad (15)$$

and $$m_3 = 0.176\gamma/0.258 = 0.681\gamma \quad (16)$$

Now substituting equations (14) to (16) into equations (1) and (2), $$m_1m_2 = 0.935\alpha\beta \text{ ("tish")} \quad (17)$$

$$m_2m_3 = 1.18\beta\gamma \text{ (920 KHz)} \quad (18)$$

In order to determine the relative visibility of these distortion components in the reproduced picture, it is necessary that they be compared respectively to the amplitude of the maximum 3.58 MHz signal in the system and to the amplitude of the maximum low frequency picture signal relative to the picture carrier. For this purpose, the maximum low frequency signal is selected to be close enough to the picture carrier that it is not affected by the transfer characteristic $\alpha$ and thus is $m_1/\alpha$. This is done by taking the ratios:

$$\text{ratio}_1 = \text{tish signal } (m_1m_2)/\text{max 3.58 MHz sig.}(m_3) = 0.935\alpha\beta/0.681\gamma = 1.37\alpha\beta/\gamma \quad (19)$$

$$\text{ratio}_2 = \frac{\text{920 KHz. signal}(m_2m_3)}{\frac{m_1}{\alpha}} = \frac{1.18\beta\gamma}{0.541} = 2.18\beta\gamma \quad (20)$$

From the latter equations (19) and (20), it can be observed that:

a. the factor $\alpha\beta/\gamma$ should be selected so that $\text{ratio}_1$ will be some moderately small fraction resulting in the reproduced picture chroma having negligible "tish," and b. the factor $\beta\gamma$ should be selected so that $\text{ratio}_2$ will be some small fraction such as 0.01 resulting in the 920 KHz beat signal being negligible in the reproduced picture luminance. Substituting 0.01 for $\text{ratio}_2$ in equation (20):

$$\beta\gamma = 0.01/2.18 = 0.00458 \text{ or } -46.8 \text{ db} \quad (21)$$

The choice of $\beta\gamma$ is fairly easy to make, but the choice of a tolerable value for $\alpha\beta/\gamma$ in equation (19) is considerably more difficult. For one thing, the NTSC system is supposed to be a "constant luminance" system. This can only mean that a disturbance in the chroma channel will not appear as a luminance disturbance, but only as a hue disturbance, and the eye is said to be much more aware of a luminance disturbance than of a chrominance disturbance. The question is, therefore, what exactly, in numbers, do the relative amplitudes become to cause equal annoyance. Another factor to be considered is the frequency of occurrence of luminance signals in the video frequency range of 920 KHz ± 600 KHz of sufficient time duration and amplitude to produce tish that lasts long enough with enough intensity to be annoying. A third factor is that the heterodyne frequency produced by beating the unmodulated sound I.F. with luminance components produces so-called "low visibility" signals in the chrominance channel. The reason for this is that 4.5 MHz is the 286th harmonic of the horizontal scanning frequency whereas chroma frequencies are odd multiples of half the line frequency. Tests have shown that the interleaving produces up to 17 db of visibility protection. When the sound carrier is FM modulated, however, beats at frequencies corresponding to chroma sidebands can be produced. Usually these are fleeting by nature, and since they may occur at times when the 920 KHz ± 600 KHz amplitudes in the luminance channel are low, only part of the time is tish likely to be produced.

In the simplified circuit of FIG. 1, network 12 provides the desired shaping, i.e., values of $\alpha$, $\beta$, and $\gamma$, such that there is produced a sharp falling off of response for frequencies fairly close to the carrier frequency leveling off smoothly to a plateau for higher modulation frequencies where the attenuation is fairly constant. This is shown in FIG. 4. Network 12 comprises a shunt tuned LC circuit 22–23 tuned to the carrier frequency and connected in series with a relatively low resistance 21. The IF ahead of this point feeds the circuit 21 to 23 through a source or generator resistance 20 of relatively higher value. Using conventional network theory, the values of the components in network 12 in order to approximate the bandpass curve of FIG. 4 will be shown to be:

$R_{20} = 2.0\text{K}\ \Omega$
$R_{21} = 152\ \Omega$
$L_{22} = 0.674\ \mu\text{ hy}$
$C_{23} = 180\text{ pf}$ After detection, network 14 restores the amplitudes and phases to the original condition. The network 14 is shown as resistor 26 in shunt with capacitor 25, the shunt circuit being in series with resistor 24 in the line as shown and a resistor 27 being shunted across the line as shown. The values of the components in complementary network 14 will be shown to be:

$R_{24} \approx 0$ $R_{26} = 39\ K\Omega$
$R_{27} = 3.0 K\Omega$
$C_{25} = 20.2$ pf If $R_{24}$ cannot be made zero in a practical circuit, then $R_{27}$ may be decreased by the value of $R_{24}$ without affecting the desired frequency response; that is, if for example $R_{24}$ is 600 ohms, then $R_{27}$ must be made 3000 − 600 = 2400 ohms instead of 3000 ohms.

The manner of determining the above values for networks 12 and 14 will now be developed.

Figure 5:
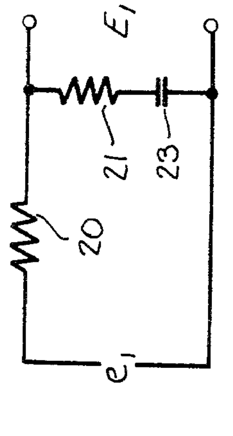

A low frequency analog of the I.F. circuit 12 may be obtained by omitting the inductor 22, as shown in FIG. 5, and noting that the capacitor 23 must be one half the low frequency analog capacitor.

Solving the FIG. 5 circuit for $E_1/e_1$, where $e_1$ is the input voltage to circuit 12 from I.F. amplifier 11 and $E_1$ is the output voltage from circuit 12 to second detector 13, and $-jX_{23}$ is the reactance of capacitor 23:

$$E_1/e_1 = R_{21} - jX_{23}/(R_{21} + R_{20}) - jX_{23} \quad (22)$$

Figure 6:
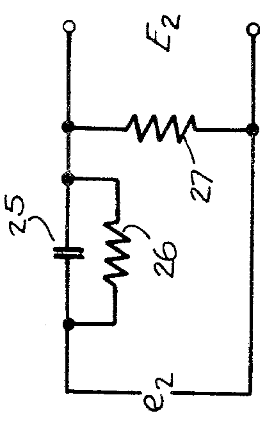
FIGS. 5 and 6 are analog schematics useful in explaining the invention;.

FIG. 6 shows the complementary video circuit 14 where $e_2$ is the input voltage to circuit 14 from detector 13 and $E_2$ is the output voltage from circuit 14 to utilization circuits 15, 16 and 17, and $-jX_{25}$ is the reactance of capacitor 25. Solving the FIG. 6 circuit for $E_2/e_2$:

$$\frac{E_2}{e_2} = \frac{(R_{26} - jX_{25})\ \dfrac{R_{27}}{R_{26}+R_{27}}}{\dfrac{R_{26}R_{27}}{R_{26}+R_{27}} - jX_{25}} \quad (23)$$

Now eq. (23) will truly be complementary to eq. (22) if, when it is multiplied by eq. (22), the result is a constant K independent of frequency; that is, it is desired that $$K = \frac{E_1}{e_2}\cdot\frac{E_2}{\rho_2} = \frac{R_{21} - jX_{23}}{R_{21} + R_{20} - jX_{23}}\cdot\frac{(R_{26} - jX_{25}\left(\dfrac{R_{27}}{R_{26}+R_{27}}\right)}{\dfrac{R_{26}R_{27}}{R_{26}+R_{27}} - jX_{25}} \quad (24)$$

Now at zero frequency all reactances are infinite so:

$$K = R_{27}/R_{26} + R_{27} \quad (25)$$

At infinite frequency all reactances are zero, so:

$$K = R_{21}/R_{21} + R_{20} \quad (26)$$

From equations (25) and (26), then, it is seen that:

$$R_{27}/R_{21} = (R_{26} + R_{27})/(R_{21} + R_{20}) = R_{26}/R_{20}$$

It is also seen from eq. (24) that:

$$X_{23}/R_{21} + R_{20} = X_{25}/X_{26} \text{ or } C_{25} = C_{23}\ (R_{21} + R_{20})/R_{26} \quad (28)$$

Before it is possible to proceed with the actual specification of component values, some numerical relationships must be decided upon. One of these is a decision as to the attenuations of I.F. frequencies corresponding to the video color subcarrier frequency of 3.58 MHz with respect to the I.F. corresponding to the picture carrier and to very low video frequencies. The other bit of information needed is the band-width of the peak in response around the picture carrier.

It has been found that effective suppression of the 920 KHz beat frequency can be attained if the combined attenuation of the color subcarrier I.F. at 42.17 MHz and the sound subcarrier at 41.25 MHz were in the order of 46 DB. It has also been found that an I.F. bandwidth for an augmented carrier system when the carrier at 45.75 MHz was located at the 50% point along the high frequency slope of the I.F. frequency response characteristic should be approximately 200 KHz; however, because there is no problem of synchronization, let the bandwidth be 400 KHz.

The relationship between $R_{20}$ and $R_{21}$ is determined by the −46 db figure. As a starting point in the design assume that −46 db attenuation is divided equally between color and sound so that −23 db is to be the design figure. Now −23 db is 0.0707 and is therefore the K of equations (25) and (26). In the circuit, the value of $R_{20}$ is usually determinable by test. The value of $R_{21}$ may therefore be solved in equation (26), or $$R_{21} = KR_{20}/(1-K) \quad (29)$$

Substituting 0.0707 for $K$, $$R_{21} = 0.0707\ R_{20}/1 - 0.0707 = 0.076\ R_{20} \quad (30)$$

Substituting this into eq. (22), $$E_1/e_1 = 0.076\ R_{20} - jX_{23}/1.076\ R_{20} - jX_{23} \quad (31)$$

Now the response at 200 KHz will be −3 db (or 0.707) by stipulation; therefore, the value of $X_{23}$ at 200 KHz may be solved for by setting the absolute value of eq. (31) equal to 0.707. Hence, $$0.707 = \sqrt{\frac{0.076^2 R_{20}^2 + X_{23}^2}{1.076^2 R_{20}^2 + X_{23}^2}} \quad (32)$$

Solving for $X_{23}$ $$X_{23} = 1.076\ R_{20} \quad (33)$$

But $X_{23} = 1/\omega C_{23}$ and $\omega = 2\pi$ (200,000); therefore from eq. (33).

$$C_{23} = 1/\omega X_{23} = 1/2\pi(2)\ 10^5\ (1.076)\ R_{20} = 0.74 \times 10^{-6}/R_{20} \quad (34)$$

If $R_{20}$ = 2000 ohms then $$C_{23} = 0.74 \times 10^{-6}/2000 = 370 \times 10^{-12} \text{ farads} \quad (35)$$

The I.F. capacitor in circuit 12 must therefore be 185 pf. or one half the low frequency analog capacitance of 370 pf.

The value of the inductor L 22 is determined by the value required to resonate $C_{23}$ in FIG. 1 at the picture I.F. of 45.75 MHz, which yields a value of 0.674 microhenries for L 22.

A standard commercial value of 180 pf. might be used in a practical design. It should be pointed out that a very high Q is required of this circuit so that the inductor to resonate 180 pf should have low losses or in other words, the conductor size should be relatively great.

The value of $R_{21}$ may now be determined from eq. (30) since $R_{20}$ has been chosen to be 2000 ohms; thus;

$$R_{21} = 0.076\ R_{20} = 0.076\ (2000) = 152 \text{ ohms} \quad (36)$$

The components to be used in the video frequency compensation circuit 14 of FIG. 1 will now be determined. Now $R_{27}$ corresponds to the usual video load resistance to give good response out to high video frequencies, so that the value of $R_{27}$ may be assumed. Suppose $R_{27}$ is 3000 ohms.

From eq. (25), solving for $R_{26}$, $$R_{26} = (1-K)R_{27}/K \qquad (37)$$

Substituting 3000 for $R_{27}$ and 0.0707 for K, $$R_{26} = 0.9293\ (3000)/0.0707 \approx 39{,}400 \text{ ohms} \qquad (38)$$

A standard 39,000 ohm resistor may be used.

Finally, the value of $C_{25}$ may be determined from eq. (28), and is $$C_{25} = C_{23}\ (R_{20} + R_{21})/R_{26} = 370\ (2000 + 152)/39400 = 20.2 \text{ pf.} \qquad (39)$$

This completes the design of the circuit. There remains only the problem of determining the performance as regards "tish," sound, and 920 KHz. The input circuit, FIG. 5 will now be evaluated in the frequency domain as given by eq. (22) but reduced to absolute values. This has already been done for one frequency in eq. (32) where it was found that $X_{23}$ had to be 1.076 $R_{20}$ in eq. (33). Therefore, a new equation for $E_1/e_1$ may be written like eq. (32) where the frequency term is always a multiple of 200 KHz, that is, the ratio $E_1/e_1$ is given by $$\frac{E_1}{e_1} = \sqrt{\frac{0.076^2 R_{20}^2 + \frac{1.076^2 R_{20}^2}{n^2}}{1.076^2 R_{20}^2 + \frac{1.076^2 R_{20}^2}{n^2}}} = \sqrt{\frac{0.005 + \frac{1}{n^2}}{1 + \frac{1}{n^2}}} \qquad (40)$$

where $n$ is a multiple of 200 KHz.

Note that eq. (40) is a sort of universal equation so that later on, if it is desired to change the −3 db point to some other frequency than 200 KHz, n will be multiples of the new frequency so chosen.

The following table is prepared from eq. (49), for frequencies F removed from the carrier:

| F KHz | $n$ | $E_1/e_1$ | $E_1/e_1$ in DB |
|---|---|---|---|
| 0 | 0 | 1.000 | 0.0 |
| 200 | 1 | 0.707 | −3.0 |
| 400 | 2 | 0.450 | −7.0 |
| 600 | 3 | 0.323 | −9.8 |
| 800 | 4 | 0.252 | −12.0 |
| 1000 | 5 | 0.208 | −13.6 |
| 2000 | 10 | 0.122 | −18.3 |
| 3600 | 18 | 0.090 | −21.0 |
| 4600 | 23 | 0.083 | −31.6 |

TABLE 1. Frequency Response of Detector Input Circuit

Now consider the performance as determined by equation (21) for 920 KC. In Table 1, $\gamma$ is the transmission at 3600 KHz, and is −21.0 db. The value $\beta$ is that at 4600 KHz, and is −21.6 db. The term $\beta\gamma$ is therefore (−21.0 −21.6) = −42.6 db, which is fairly close to the −46.8 db figure of eq. (21). All that is required is to provide a little more attenuation in the main I.F. amplifier at 41.25 MHz to achieve the needed extra −4.2 db. But before selecting this figure, first examine the tish situation. The value of $\alpha$, the low frequency that can beat with the sound to produce frequency components in the chrominance band may be chosen in Table 1 for frequencies surrounding 920 KHz. Suppose the value of 800 KHz is selected. In this event $\alpha$ = −12 db. The $\text{ratio}_1$ of eq. (19) therefore becomes:

$$\text{ratio}_1 = 1.37\alpha\beta/\gamma = 1.37\ (0.252)\ (0.083)/0.090 = 0.318 \text{ or } -10 \text{ db (tish)} \qquad (41)$$

whereas the $\text{ratio}_2$ of eq. (20), $$\text{ratio}_2 = 2.18\beta\gamma = 2.18\ (0.083)\ (0.090) = 0.0162 \text{ or } -35.8 \text{ db (920 KHz)} \qquad (42)$$

The interesting fact in these equations is that $\beta$, the transmission for 41.25 MHz sound, occurs in the numerator of both $\text{ratio}_1$ and $\text{ratio}_2$; therefore, if $\beta$ is decreased, both $\text{ratio}_1$ and $\text{ratio}_2$ will be helped. But $\beta$ should not be decreased indefinitely or there will be trouble in the recovery of sound. In general, the value of $\beta$ should not be less than, say, 0.1 to 0.05 of $\alpha$. If the 0.05 figure (or −26 db) is adopted for design purposes, then since $\alpha$ is −12 db, $\beta$ should not be less than −12 −26 = −38 db. But the shaping circuit alone provides −21.6 db from Table 1; therefore, the extra attenuation needed in the main I.F. is only the difference, or about 16.4 db. A very simple trap can provide this kind of attenuation without disturbing to any great extent the transmission at 42.17 MHz, the I.F. of the chrominance.

If this additional sound trapping is added, then, $\beta$ becomes −38 db or 0.0125, and equations (41) and (42) become −16.4 db more, or $$\text{ratio}_1 = -26.4 \text{ db (tish)} \qquad (43)$$

$$\text{ratio}_2 = -52.2 \text{ db (920 KHz)} \qquad (44)$$

The 920 KHz will now be invisible in the picture because −40 db was said to be sufficient. The tish ratio of −26.4 db is 0.048 or about 5 times greater than the 0.01 figure used for 920 KHz, but as explained earlier, the tish attenuation need not be as great, and that one-fifth the attenuation probably is sufficient.

It should be pointed out that since $\beta$ cannot be reduced further unless $\alpha$ is also reduced, that the only way left to reduce the tish is to reduce the bandwidth, thereby reducing the value of $\alpha$. This recourse is doubly effective in reducing tish since not only does $\alpha$ become less, but $\beta$ is permitted to become less to a corresponding degree. Thus a 2 to 1 reduction in bandwidth can be expected to give a 4 to 1 reduction in tish.

The response of the complementary circuit may either be computed from the component values assumed and derived, or it may be deduced directly from Table 1 by assuming the total attenuation, i.e., the sum of the attenuation in circuit 12 and of the attenuation in circuit 14, to be 23 db at all frequencies since that was the design criterion. Table 2 shows the frequency response transmission values at the same frequencies used in Table 1.

| F KHz | $E_2/e_2$ | $E_2/e_2$ in DB |
|---|---|---|
| 0 | 0.0707 | −23.0 |
| 200 | 0.100 | −20.0 |
| 400 | 0.157 | −16.0 |
| 600 | 0.219 | −13.2 |
| 800 | 0.281 | −11.0 |
| 1000 | 0.340 | −9.4 |
| 2000 | 0.580 | −4.7 |
| 3600 | 0.785 | −2.1 |
| 4600 | 0.853 | −1.4 |

TABLE 2. Frequency Response of Video Complementary Circuit

Figure 7:
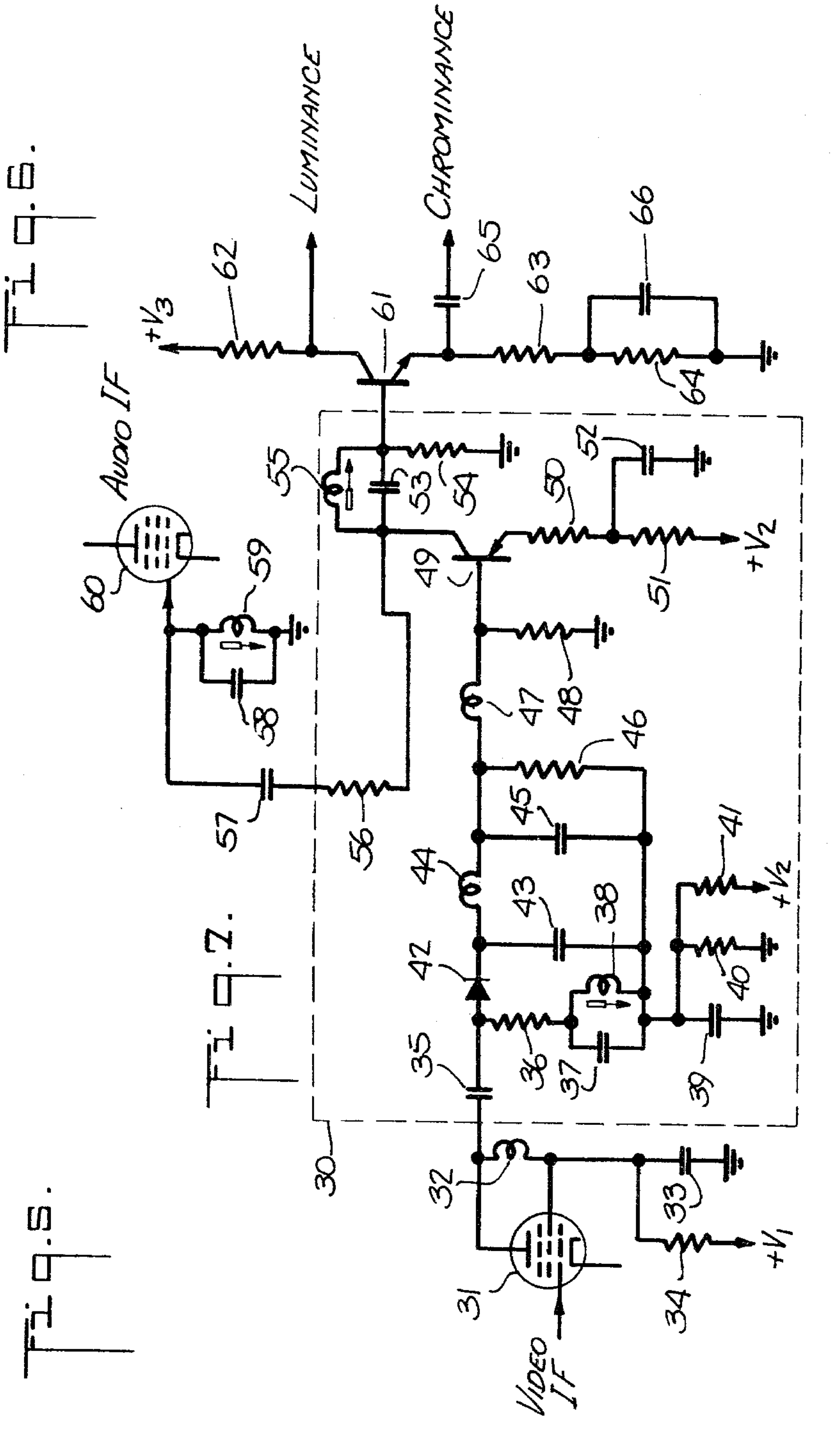
FIG. 7 is a schematic of an actually constructed and successfully operated embodiment of this invention.

In FIG. 7, an actually constructed embodiment of the invention is shown that performed well in a General Electric Model KE Chassis color television receiver with the reproduced picture having no noticeable luminance or chrominance distortion. Moreover, the set could be substantially detuned with no sound carrier interference appearing in the picture owing to the existing relatively flat response in the vicinity of the chrominance sub-carrier and sound carrier.

In the partial schematic of FIG. 7, the dashed box indicates the portion of the Model KE chassis which was modified to incorporate the present invention.

The single second detector system of FIG. 7 includes an intermediate frequency amplifier 31 supplying the I.F. television signal to the input of the detector 42 within system 30. An inductor 32 is coupled from the plate of amplifier 31 to the screen to form a resonant circuit with the output capacitance of the tube so that the plate circuit of tube 31 serves as a constant current input source at IF frequencies to detector 42 within 30. The IF signal is coupled through DC blocking capacitor 35 to the shaping network comprised of resistor 36 and the tuned circuit including capacitor 37 and inductor 38. Capacitor 39 is a bypass to ground at IF frequencies and the voltage divider including resistors 40 and 41 serve as a dc bias source for the detector 42 to counteract the bias established across resistor 48 caused by the base current in transistor 49.

System 30 also includes a single second detector comprised of diode rectifier 42 followed by filter network 43–47. As will be explained, the value of detector load resistor 46 will have a bearing on the component values for shaping network 36–38 but in all other respects the second detector circuit of system 30 is of conventional construction.

The output of the second detector consists of a composite video frequency wave which is at improper relative amplitudes due to the effect of shaping network 36–38. To compensate for this, the signal is amplified in a complementary amplifier circuit including transistor 49 wherein the compensation is provided by the emitter circuit components 50–52. This may be recognized as a degenerative amplifier such that the amplification depends upon the input signal frequency; the higher the frequency, the lower is the degenerative effect, and thus the greater is the effective amplification. The output of amplifier 49 is then supplied directly to sound, chrominance, and luminance uitlization circuits in a straightforward manner. Audio takeoff network 56, 57, 58, 59 supplies the modulated sound intermediate frequency carrier to audio IF amplifier 60, while a conventional trap network 53, 55 blocks its passage to the chrominance and luminance circuits. A conventional amplifier, including transistor 61, serves to amplify the luminance and chrominance subcarrier signals in the usual manner prior to subsequent processing in the receiver.

Shaping network 36–38 includes a tuned circuit 37, 38 sharply tuned to the picture IF frequency. The bandwidth of this circuit is determined partly by its own Q and partly by the loading effect of the detector circuit including load resistor 48. In the circuit of FIG. 7, the bandwidth is approximately 400 KHz at the −3 db point, although it will be appreciated that other bandwidths may be employed. Resistor 36 provides a lower limit of attenuation towards which the bandpass characteristic of the shaping becomes asymptotic at the higher frequencies (i.e., frequencies away from the picture carrier) of the sound carrier and chrominance subcarrier.

For the circuit of FIG. 7, the following component values have proven to provide a successful detector system according to the invention. It will be appreciated that other circuits may also be used without departing from the scope of the invention as set forth in the appended claims.

Resistors 34 = 470 Ω
36 = 130 Ω
40 = 4.7 K Ω
41 = 2.2 K Ω
Resistors 46 = 10 K Ω
48 = 680 K Ω
50 = 100 Ω
51 = 1.5 K Ω
54 = 1.5 K Ω
56 = 1.5 K Ω
62 = 12 K Ω
63 = 510 Ω
64 = 120 Ω
Capacitors 33 = 560 pf
35 = 800 pf
37 = 120 pf
39 = 1800 pf
43 = 6 pf
45 = 4 pf
52 = 560 pf
53 = 100 pf
57 = 15 pf
58 = 33 pf
65 = 200 pf
66 = 6800 pf
Inductors 32 = 1.8μH
38 = .146μH
44 = 1.8μH
47 = 36 μH
55 = 12.5μH
59 = 26.0μH
Tubes 31 = 6CJ6
60 = 6M11
Transistors 49 = MPS 6518
61 = MPS U03
Diode 42 = 1N 87A

Analysis of the Vestigial Sideband NTSC System

Television transmission and reception according to U.S. standards is effected by the vestigial sideband system with the picture carrier located on the slope of an attenuation curve where the attenuation is two times that at the top of the curve where full transmission and reception occur. The slope of the attenuating region is such that the frequency rnage encompassed between essentially zero transmission and full transmission is approximately 1.5 MHz, so that the system is single sieband for modulating frequencies of picture signals $\nu$ that are in excess of approximately 0.75 MHz. The chroma signal $\gamma$ and the sound signal $\alpha$ are both well above 0.75 MHz, as is most of the brightness frequency range; therefore, in the following analysis, it will be assumed that all modulating frequencies are above 0.75 MHz, or that the system is truly single sideband plus carrier.

The r. f. wave presented to the detector, then, consists of:

$E_p \cos \omega t$ the carrier (45)

$E_1 \cos (\omega+\nu)t$ the brightness sideband (46)

$E_2 \cos(\omega+\alpha)t$ the sound sideband (47)

$E_3 \cos(\omega+\gamma)t$ the chroma sideband (48)

in arithmetic sum form that may be written as:

$$e = E_p[\cos\omega t + m_1\cos(\omega+\nu)t + m_2\cos(\omega+\alpha)t + m_3\cos(\omega+\gamma)t] \quad (49)$$

where $$m_1 = E_1/E_p \quad (50)$$

$$m_2 = E_2/E_p \quad (51)$$

$$m_3 = E_3/E_p \quad (52)$$

In order to determine the detector output, equation (49) must be put in product form. This can be done by substituting for $\cos(x+y)$ its equivalent $\cos x \cos y - \sin x \sin y$. Equation (49) thus becomes:

$$e = E_p(\cos\omega t + m_1\cos\omega t\cos\nu t - m_1\sin\omega t\sin\nu t + m_2\cos\omega t\cos\alpha t - m_2\sin\omega t\sin\alpha t + m_3\cos\omega t\cos\gamma t - m_3\sin\omega t\sin\gamma t) \quad (53)$$

The envelope, or the output of a linear detector, is then given by the square root of the sum of the collected $\cos\omega t$ coefficient squared and the collected $\sin\omega t$ coefficient squared, or:

$$E_d = E_p\sqrt{(1+m_1\cos\gamma t+m_2\cos\sigma t+m_3\cos\gamma t)^2 + (m_1\sin\gamma t+m_2\sin\sigma t+m_3\sin\gamma t)^2} \quad (54)$$

Performing the indicated squaring within parentheses, eq. (54) becomes; upon collection and regrouping, remembering that $\sin^2 X + \cos^2 x = 1$:

$$E_d = E_p[1 + m_1^2 + m_2^2 + m_3^2 + 2m_1\cos\nu t + 2m_2\cos\beta t + 2m_3\cos\gamma t + 2m_1m_2\cos(\alpha-\nu)t + 2m_1m_3\cos(\gamma-\nu)t + 2m_2m_3\cos(\alpha-\gamma)t]^{1/2} \quad (55)$$

Equation (55) may now be expanded by binomial expansion of the form $(1+x)$ and becomes:

$$E_d = E_p[1 + m_1^2 + m_2^2 + m_3^2 + m_1\cos\nu t + m_2\cos\alpha t + m_3\cos\gamma t + m_1m_2\cos(\alpha-\nu)t + m_1m_3\cos(\gamma-\nu)t \quad (56)$$

$+m_2m_3\cos(\alpha-\gamma)t +$ (higher order and harmonics and cross products)]

A study of equation (56) reveals that the following output signals may be identified:

$1 + m_1^2 + m_2^2\, m_3^2$ the d. c. component $m_1\cos\nu t$ the brightness video $m_2\cos\alpha t$ the 4.5 MHz sound $m_3\cos\gamma t$ the 3.58 MHz chroma $m_1m_2\cos(\alpha-\nu)t$ a spurious signal caused by the 4.5 MHz sound beating with video (tish)

$m_1m_3\cos(\gamma-\nu)t$ a spurious signal caused by the 3.58 MHz chroma beating with video $m_2m_3\cos(\alpha-\gamma)t$ a spurious signal caused by the 4.5 MHz sound beating with the 3.58 MHz chroma (920 KHz)

The first four signals are of course desired, but the last three signals are spurious and are not desired.

What is claimed is:

1. In an NTSC color television receiver, a detector system comprising:

means for receiving an NTSC signal;

a bandpass circuit after the receiving means, for selectively attenuating the NTSC signal so that a single detector may be used for both audio and video with suppression of tish and 920 KC picture disturbances to the extent of invisibility of those disturbances to the normal human eye; the bandpass circuit comprising means for establishing a transfer characteristic which, in the presence of maximum subcarrier, and relative to the transfer characteristic of the picture carrier:

decreases smoothly from the picture carrier to be down about 12 db in the region of about 1.0 MHz from the carrier;

and, thereafter decreases smoothly to be down about 23 db in the region of the chrominance and sound subcarrier;

single detector means for deriving from said bandpass circuit, a luminance signal, a chrominance subcarrier signal, and an intercarrier sudio signal, which signals are at improper relative amplitudes because of the transfer characteristics of the bandpass circuit;

a restoring circuit, after the single detector means, for restoring the proper relative amplitudes to the detected signals;

and circuit means, after the restoring circuit, for supplying the luminance signal, the chrominance subcarrier signal, and the intercarrier audio signal directly to subsequent utilization circuits.

2. A system as in claim 1 in which:

the means for receiving includes a first detector for reducing the NTSC signal to an intermediate frequency;

and, the single detector means is a second detector.

3. A system as in claim 1 in which the bandpass circuit transfer characteristic also:

decreases smoothly to be down about 3 db in the region of about 300 KHz from the picture carrier.

4. A system as in claim 2 in which the bandpass circuit transfer characteristic also:

decreases smoothly to be down about 3 db in the region of about 300 KHz from the picture carrier.

* * * * *